US012427984B2

(12) United States Patent
Kim (10) Patent No.: US 12,427,984 B2
(45) Date of Patent: Sep. 30, 2025

(54) DRIVER ASSISTANCE SYSTEM AND METHOD OF CONTROLLING THE SAME (71) Applicant: HL Klemove Corp., Incheon (KR)

(72) Inventor: Inho Kim, Seoul (KR)

(73) Assignee: HL KLEMOVE CORP., Incheon (KR)

( * ) Notice: Subject to any disclaimer, the term of this patent is extended or adjusted under 35 U.S.C. 154(b) by 328 days.

(21) Appl. No.: 17/835,161

(22) Filed: Jun. 8, 2022

(65) Prior Publication Data
US 2022/0396266 A1 Dec. 15, 2022

(30) Foreign Application Priority Data
Jun. 9, 2021 (KR) .................. 10-2021-0075035

(51) Int. Cl.
B60W 30/16 (2020.01)
B60W 40/09 (2012.01)
B60W 50/10 (2012.01)

(52) U.S. Cl.
CPC .......... *B60W 30/162* (2013.01); *B60W 40/09* (2013.01); *B60W 50/10* (2013.01); *B60W 2510/0652* (2013.01); *B60W 2510/069* (2013.01)

(58) Field of Classification Search
CPC .... B60W 30/162; B60W 40/09; B60W 50/10; B60W 2510/0642; B60W 2510/069
See application file for complete search history.

(56) References Cited

U.S. PATENT DOCUMENTS

| 2006/0195231 | A1* | 8/2006 | Diebold | B60T 8/17558 701/1 |
| 2015/0224990 | A1* | 8/2015 | Kim | B60W 50/0097 701/93 |
| 2021/0070308 | A1* | 3/2021 | Kim | B60W 60/0053 |

FOREIGN PATENT DOCUMENTS

| KR | 10-2012-0121698 A | 11/2012 |
| KR | 10-1500259 B1 | 3/2015 |
| KR | 20-2015-0003798 U | 10/2015 |
| KR | 10-2021-0030528 A | 3/2021 |

OTHER PUBLICATIONS

Office Action issued on Sep. 27, 2023, for corresponding Korean Patent Application No. 10-2021-0075035, along with an English machine translation (10 pages).

* cited by examiner

*Primary Examiner* — Adam D Tissot
(74) *Attorney, Agent, or Firm* — Hauptman Ham, LLP

(57) ABSTRACT

Provided is a driver assistance system (DAS) including: a storage configured to store driver tendency data including an amount of decrease in acceleration when a vehicle approaches a specific section, in a state in which an adaptive cruise control (ACC) of the vehicle is deactivated; and a controller including at least one processor configured to process the driver tendency data, wherein the controller is configured to, upon the vehicle re-entering the specific section during travel of the vehicle with the ACC, control the vehicle to perform one of acceleration control and deceleration control based on the driver tendency data.

16 Claims, 7 Drawing Sheets

DRIVER ASSISTANCE SYSTEM AND METHOD OF CONTROLLING THE SAME

CROSS-REFERENCE TO RELATED APPLICATION

This application is based on and claims priority under 35 U.S.C. § 119 to Korean Patent Application No. 10-2021-0075035, filed on Jun. 9, 2021 in the Korean Intellectual Property Office, the disclosure of which is incorporated herein by reference.

BACKGROUND

1. Field

The disclosure relates to a driver assistance system (DAS), and more specifically, to a DAS that reflects a driving tendency of a driver during adaptive cruise control (ACC) and a method of controlling the same.

2. Description of the Related Art

An adaptive cruise control (ACC) system that maintains an appropriate distance from a preceding vehicle using sensors, such as radar and the like, on the front side of a vehicle. During ACC, acceleration or deceleration of the vehicle is controlled by recognizing only the preceding vehicle, which causes a sense of insecurity or alienation to the driver in an exit road section.

In order to overcome the limitations, navigation-based smart cruise control (NACC) has been proposed, but NACC only reflects road related information rather than reflecting the individual driving tendency of the driver.

SUMMARY

Therefore, it is an object of the disclosure to provide a DAS capable of reflecting an individual driving tendency of a driver in adaptive cruise control (ACC) and a method of controlling the same.

The technical objectives of the disclosure are not limited to the above, and other objectives may become apparent to those of ordinary skill in the art based on the following descriptions.

According to an aspect of the disclosure, there is provided a driver assistance system (DAS) including: a storage configured to store driver tendency data including an amount of decrease in acceleration when a vehicle approaches a specific section, in a state in which an adaptive cruise control (ACC) of the vehicle is deactivated; and a controller including at least one processor configured to process the driver tendency data, wherein the controller is configured to, upon the vehicle re-entering the specific section during travel of the vehicle with the ACC, control the vehicle to perform one of acceleration control and deceleration control based on the driver tendency data.

The storage may be configured to store the driver tendency data further including at least one of a deceleration start position or a deceleration completion position when the vehicle approaches the specific section, in the state in which ACC of the vehicle is deactivated.

The storage may be configured to cumulatively store the driver tendency data whenever the vehicle enters the specific section.

The specific section may include at least one of a merging section, an exit section, an intersection, a U-shaped slope section, or a velocity limit section.

The controller may be configured to compare an ACC acceleration based on the ACC with a pre-controlled acceleration based on the driver tendency data, and in response to the ACC acceleration being greater than the pre-controlled acceleration, control the vehicle to perform at least one of the acceleration control or the deceleration control according to the ACC acceleration.

The controller may be configured to compare an ACC acceleration based on the ACC with a pre-controlled acceleration based on the driver tendency data, and in response to the pre-controlled acceleration being greater than the ACC acceleration, control the vehicle to perform at least one of the acceleration control or the deceleration control according to the pre-controlled acceleration.

The controller may be configured to compare the pre-controlled acceleration with a predetermined acceleration limit, and in response to the pre-controlled acceleration being less than the predetermined acceleration limit, control the vehicle to perform at least one of the acceleration control or the deceleration control according to the pre-controlled acceleration.

The controller may be configured to compare the pre-controlled acceleration with a predetermined acceleration limit, and in response to the pre-controlled acceleration being greater than the predetermined acceleration limit, control a warning module to notify the driver of a warning situation.

The controller may be configured to compare the pre-controlled acceleration with a predetermined acceleration limit, and in response to the pre-controlled acceleration being greater than the predetermined acceleration limit, control the vehicle to perform at least one of the acceleration control or the deceleration control according to the predetermined acceleration limit.

The controller may be configured to, upon the vehicle entering the specific section and reaching the stored deceleration start position in a state in which the ACC is activated, control the vehicle to perform at least one of the acceleration control or the deceleration control according to the pre-controlled acceleration based on the driver tendency data, and upon the vehicle reaching the stored deceleration completion position, control the vehicle to perform at least one of the acceleration control or the deceleration control according to the ACC acceleration base on the ACC.

According to another aspect of the disclosure, there is provided a method of controlling a driver assistance system (DAS), the method including: storing driver tendency data including an amount of decrease in acceleration when a vehicle approaches a specific section, in a state in which an adaptive cruise control (ACC) of the vehicle is deactivated; and upon the vehicle re-entering the specific section during travel of the vehicle with the ACC, controlling the vehicle to perform one of acceleration control and deceleration control based on the driver tendency data.

The storing of the driver tendency data may include storing the driver tendency data further including at least one of a deceleration start position or a deceleration completion position when the vehicle approaches the specific section, in the state in which ACC of the vehicle is deactivated.

The storing of the driver tendency data may include cumulatively storing the driver tendency data whenever the vehicle enters the specific section.

The specific section may include at least one of a merging section, an exit section, an intersection, a U-shaped slope section, or a velocity limit section.

The controlling of the vehicle may include comparing an ACC acceleration based on the ACC with a pre-controlled acceleration based on the driver tendency data, and in response to the ACC acceleration being greater than the pre-controlled acceleration, controlling the vehicle to perform at least one of the acceleration control or the deceleration control according to the ACC acceleration.

The controlling of the vehicle may include comparing an ACC acceleration based on the ACC with a pre-controlled acceleration based on the driver tendency data, and in response to the pre-controlled acceleration being greater than the ACC acceleration, controlling the vehicle to perform at least one of the acceleration control or the deceleration control according to the pre-controlled acceleration.

The controlling of the vehicle may include comparing the pre-controlled acceleration with a predetermined acceleration limit, and in response to the pre-controlled acceleration being less than the predetermined acceleration limit, control the vehicle to perform at least one of the acceleration control or the deceleration control according to the pre-controlled acceleration.

The controlling of the vehicle may include comparing the pre-controlled acceleration with a predetermined acceleration limit, and in response to the pre-controlled acceleration being greater than the predetermined acceleration limit, controlling a warning module to notify the driver of a warning situation.

The controlling of the vehicle may include comparing the pre-controlled acceleration with a predetermined acceleration limit, and in response to the pre-controlled acceleration being greater than the predetermined acceleration limit, controlling the vehicle to perform at least one of the acceleration control or the deceleration control according to the predetermined acceleration limit.

The controlling of the vehicle may include, upon the vehicle entering the specific section and reaching the stored deceleration start position in a state in which the ACC is activated, controlling the vehicle to perform at least one of the acceleration control or the deceleration control according to the pre-controlled acceleration based on the driver tendency data, and upon the vehicle reaching the stored deceleration completion position, controlling the vehicle to perform at least one of the acceleration control or the deceleration control according to the ACC acceleration base on the ACC.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Like numerals refer to like elements throughout the specification. Not all elements of embodiments of the present disclosure will be described, and description of what are commonly known in the art or what overlap each other in the embodiments will be omitted. The terms as used throughout the specification, such as "~part", "~module", "~member", "~block", etc., may be implemented in software and/or hardware, and a plurality of "~parts", "~modules", "~members", or "~blocks" may be implemented in a single element, or a single "~part", "~module", "~member", or "~block" may include a plurality of elements.

It will be further understood that the term "connect" or its derivatives refer both to direct and indirect connection, and the indirect connection includes a connection over a wireless communication network.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof, unless the context clearly indicates otherwise.

In the specification, it will be understood that, when a member is referred to as being "on/under" another member, it can be directly on/under the other member, or one or more intervening members may also be present.

The terms including ordinal numbers like "first" and "second" may be used to explain various components, but the components are not limited by the terms. The terms are only for the purpose of distinguishing a component from another.

As used herein, the singular forms "a," "an" and "the" are intended to include the plural forms as well, unless the context clearly indicates otherwise.

Reference numerals used for method steps are just used for convenience of explanation, but not to limit an order of the steps. Thus, unless the context clearly dictates otherwise, the written order may be practiced otherwise.

Hereinafter, the operating principles and embodiments of the disclosure will be described with reference to the accompanying drawings.

Figure 1:
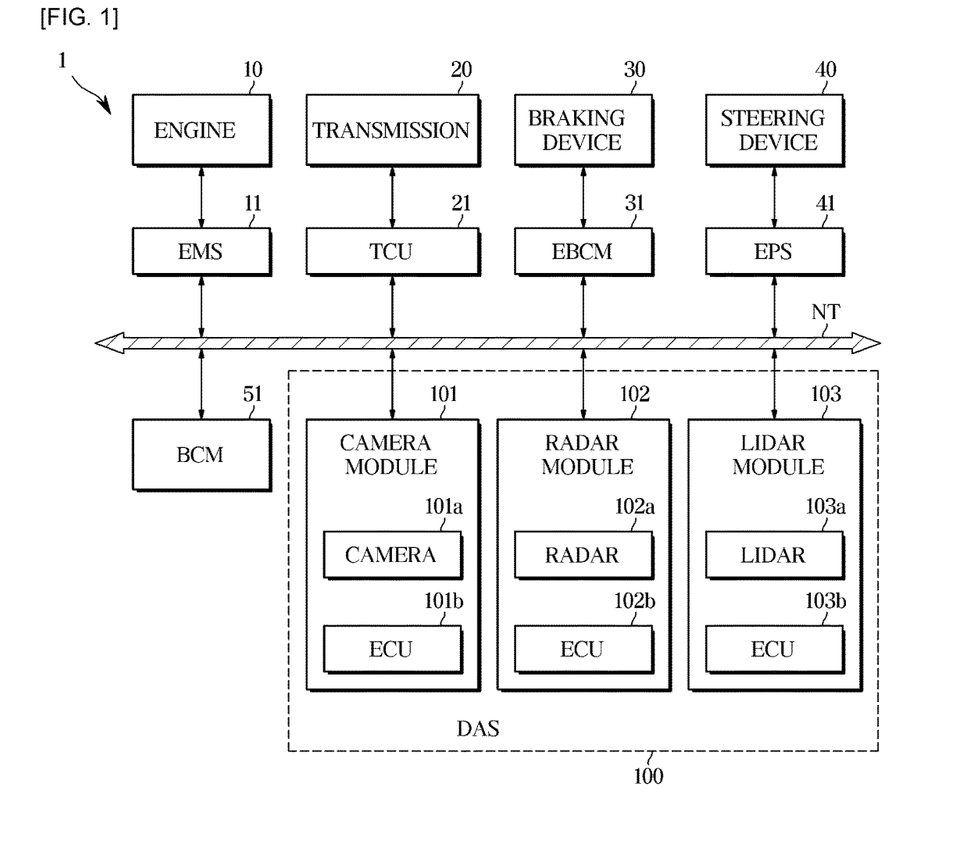
FIG. 1 is a view illustrating a configuration of a vehicle according to an embodiment.

FIG. 1 is a view illustrating a configuration of a vehicle according to an embodiment.

Referring to FIG. 1, a vehicle 1 includes an engine 10, a transmission 20, a braking device 30, and a steering device 40. The engine 10 may include a cylinder and a piston, and generate power for travelling of the vehicle 1. The transmission 20 includes a plurality of gears, and may transfer power generated by the engine 10 to wheels. The braking device 30 may decelerate the vehicle 1 or stop the vehicle 1 through friction with the wheels. The steering device 40 may change the travelling direction of the vehicle 1.

The vehicle 1 may include a plurality of electronic components. For example, the vehicle 1 may further include an engine management system (EMS) 11, a transmission controller (TCU) 21, an electronic brake control module (EBCM) 31, an electronic power steering (EPS) 41, a body control module (BCM), and a driver assistance system (DAS).

The EMS 11 may control the engine 10 in response to an acceleration intention of the driver through an accelerator pedal or a request of the DAS 100. For example, the EMS11 may control the torque of the engine 10.

The TCU 21 may control the transmission 20 in response to a shift command of the driver through a shift lever and/or a travelling velocity of the vehicle 1. For example, the TCU 21 may adjust the gear ratio of the engine 10 to the wheels.

The EBCM 31 may control the braking device 30 in response to a braking intention of the driver through a braking pedal and/or a slip of the wheels. For example, the EBCM 31 may temporarily deactivate the braking of the wheels in response to a slip of the wheels detected during braking of the vehicle 1 (anti-lock braking systems: ABS). The EBCM 31 may selectively deactivate braking of the wheels in response to over-steering and/or under-steering detected during steering of the vehicle 1 (electronic stability control: ESC). In addition, the EBCM 31 may temporarily brake the wheels in response to a slip of the wheels detected during driving of the vehicle 1 (traction control system: TCS).

The EPS 41 may assist the operation of the steering device 40 in response to a steering intention of the driver through the steering wheel such that the driver easily operates the steering wheel. For example, the EPS 41 may assist the operation of the steering device 40 such that the steering force is decreased during low-velocity travelling or parking and the steering force is increased during high-velocity travelling.

The BCM 51 may control the operation of machine parts that provide convenience to the driver or ensure the safety of the driver. For example, the BCM 51 may control a head lamp, a wiper, a cluster, a multifunction switch, a turn signal lamp, and the like.

The DAS 100 may assist the driver in manipulating (driving, braking, and steering) the vehicle 1. For example, the DAS 100 may detect a surrounding environment of the vehicle 1 (e.g., another vehicle, a pedestrian, a cyclist, a lane, a road sign, and the like), and control driving and/or braking and/or steering of the vehicle 1 in response to the detected environment.

The DAS 100 may provide the driver with various functions. For example, the DAS 100 may provide a lane departure warning (LDW), a lane keeping assist (LKA), a high beam assist (HBA), an automatic emergency braking (AEB), a traffic sign recognition (TSR), a smart cruise control (SCC), an adaptive cruise control (ACC), a blind spot detection (BSD), and the like.

The DAS 100 includes a camera module 101 that acquires image data of the surrounding of the vehicle 1 and a radar module 102 that acquires object data of the surrounding of the vehicle 1. The camera module 101 may include a camera 101*a* and an electronic control unit (ECU) 101*b*, and photograph the front of the vehicle 1 and recognize another vehicle, a pedestrian, a cyclist, a lane, a road sign, and the like. The radar module 102 may include a radar 102*a* and an ECU 102*b*, and acquire a relative position, a relative velocity, and the like of an obstacle of the surrounding of the vehicle 1 (e.g., another vehicle, a pedestrian, a cyclists, and the like).

The DAS 100 includes a LiDAR module 103 that scans the surrounding of the vehicle 1 and detects an object. The LiDAR module 103 may include a LiDAR 103*a* and an ECU 103*b*, and acquire a relative position, a relative velocity, and the like of a moving obstacle (e.g., another vehicle, a pedestrian, a cyclists, and the like) of the surrounding of the vehicle 1. In addition, the LiDAR module 103 may acquire the shape and position of a fixed object (e.g., a building, a sign, a traffic light, a bump, etc.) of the surrounding of the vehicle 1.

The above-described electronic components may communicate with each other through vehicle communication network (NT). For example, the electronic components may exchange data therebetween through Ethernet, media-oriented systems transport (MOST), Flexray, controller area network (CAN), local interconnect network (LIN), and the like. For example, the DAS 100 may transmit a driving control signal, a braking signal, and a steering signal to the EMS 11, the EBCM 31, and the EPS 41, respectively, through the NT.

Figure 2:
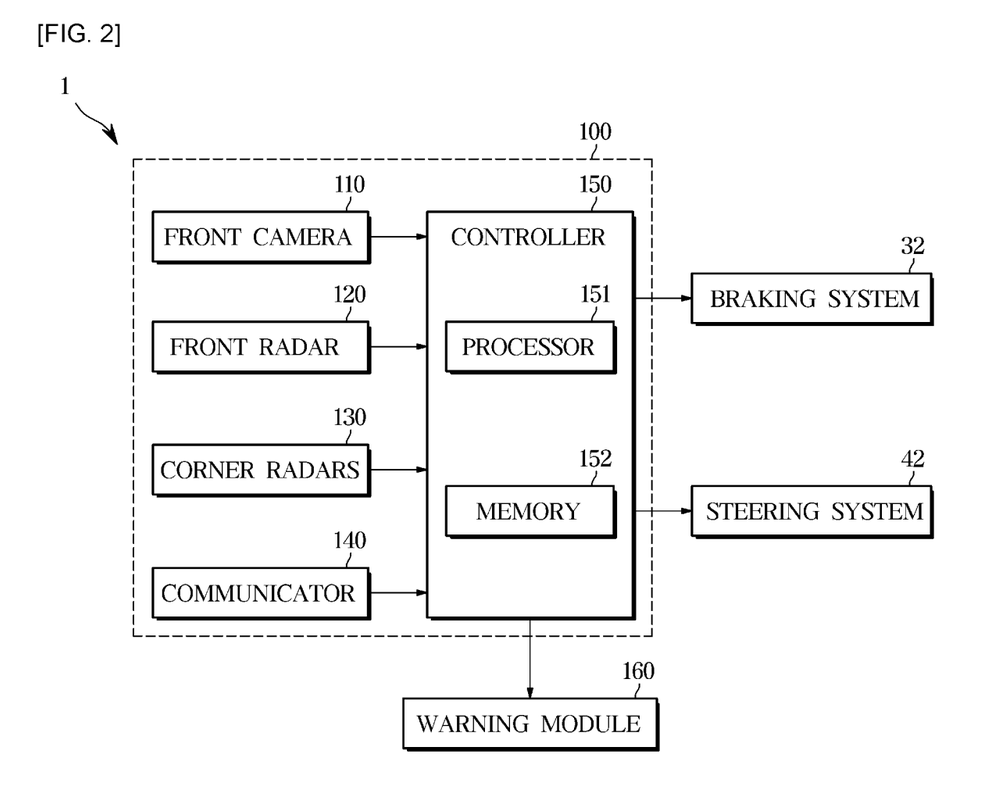
FIG. 2 is a control block diagram illustrating a DAS according to an embodiment.
Figure 3:
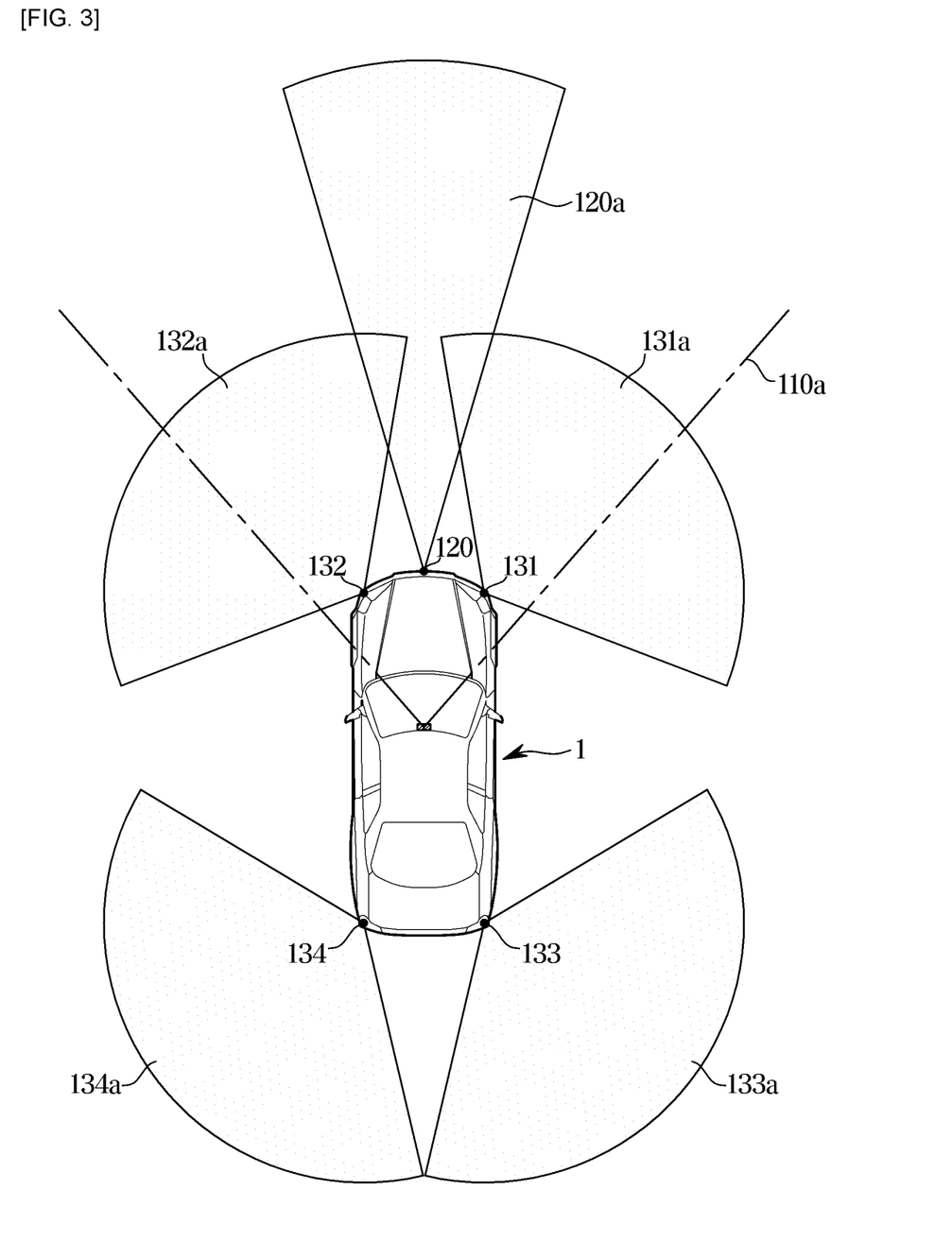
FIG. 3 is a view illustrating a camera and a radar included in a DAS according to an embodiment.

FIG. 2 is a control block diagram illustrating a DAS according to an embodiment. FIG. 3 is a view illustrating a camera and a radar included in a DAS according to an embodiment.

Referring to FIG. 2, the vehicle 1 may include a braking system 32, a steering system 42, and a DAS 100.

The braking system 32 may include the EBCM (31 in FIG. 1) and the braking device (30 in FIG. 1) described in conjunction with FIG. 1, and the steering system 42 may include the EPS (41 in FIG. 1) and the steering device (40 in FIG. 1).

The DAS 100 may include a front camera 110, a front radar 120, a plurality of corner radars 130, and a communicator 140.

The front camera 110 may have a field of view 110*a* directed to the front of the vehicle 1 as shown in FIG. 3. The front camera 110 may be installed, for example, on a front windshield of the vehicle 1.

The front camera 110 may photograph the front of the vehicle 1 and acquire image data of the front of the vehicle 1. The image data of the front of the vehicle 1 may include the position of another vehicle, a pedestrian, a cyclist, or a lane located in front of the vehicle 1.

The front camera 110 may include a plurality of lenses and an image sensor. The image sensor may include a plurality of photodiodes for converting light into electrical signals, and the plurality of photodiodes may be arranged in a two-dimensional matrix.

The front camera 110 may be electrically connected to the controller 150. For example, the front camera 110 may be connected to the controller 150 through a vehicle communication network NT, through a hard wire, or through a printed circuit board (PCB).

The front camera 110 may transmit the image data of the front of the vehicle 1 to the controller 150.

The front radar 120 may have a field of sensing 120*a* directed to the front of the vehicle 1 as shown in FIG. 3. The front radar 120 may be installed, for example, in a grille or a bumper of the vehicle 1.

The front radar 120 may include a transmission antenna (or a transmission antenna array) that radiates transmission radio waves to the front of the vehicle 1 and a reception antenna (or a reception antenna array) that receives reflection radio waves reflected from an object. The front radar 120 may acquire front radar data from the transmission radio waves transmitted by the transmission antenna and the reflection radio waves received by the reception antenna. The front radar data may include distance information and velocity information regarding another vehicle, a pedestrian, or a cyclist located in front of the vehicle 1. The front radar 120 may calculate the relative distance to the object based on the phase difference (or time difference) between the transmission radio waves and the reflection radio waves, and calculate the relative velocity of the object based on the frequency difference between the transmission radio waves and the reflected radio waves.

The front radar 120 may be connected to the controller 150 through a vehicle communication network NT, a hard wire, or a PCB. The front radar 120 may transmit the front radar data to the controller 150.

The plurality of corner radars 130 includes a first corner radar 131 installed on the front right side of the vehicle 1, a second corner radar 132 installed on the front left side of the vehicle 1, a third corner radar 133 installed on the rear right side of the vehicle 1, and a fourth corner radar 134 installed on the rear left side of the vehicle 1.

The first corner radar 131 may have a field of sensing 131*a* directed to the front right side of the vehicle 1 as shown in FIG. 3. The first corner radar 131 may be installed, for example, on the right side of a front bumper of the vehicle 1. The second corner radar 132 may have a field of sensing 132*a* directed to the front left side of the vehicle 1, and may be installed, for example, on the left side of the front bumper of the vehicle 1. The third corner radar 133 may have a field of sensing 133*a* directed to the rear right side of the vehicle 1 and may be installed, for example, on the right side of a rear bumper of the vehicle 1. The fourth corner radar 134 may have a field of sensing 134*a* directed to the rear left side of the vehicle 1 and may be installed, for example, on the left side of the rear bumper of the vehicle 1.

Each of the first, second, third and fourth corner radars 131, 132, 133, and 134 may include a transmission antenna and a reception antenna. The first, second, third, and fourth corner radars 131, 132, 133 and 134 acquire first corner radar data, second corner radar data, third corner radar data, and fourth corner radar data, respectively. The first corner radar data may include distance information and velocity information regarding another vehicle or a pedestrian or a cyclist (hereinafter referred to as "an object") positioned on the front right side of the vehicle 1. The second corner radar data may include distance information and velocity information regarding an object positioned on the front left side of the vehicle 1. The third and fourth corner radar data may respectively include distance and velocity information regarding an object located on the rear right side of the vehicle 1 and distance and velocity information regarding an object located on the rear left side of the vehicle 1, respectively.

Each of the first, second, third, and fourth corner radars 131, 132, 133 and 134 may be connected to the controller 150, for example, through a vehicle communication network NT, a hard wire, or a PCB. The first, second, third, and fourth corner radars 131, 132, 133, and 134 may respectively transmit the first corner radar data, the second corner radar data, the third corner radar data, and the fourth corner radar data to the controller 150.

The communicator 140 may include a global positioning system (GPS) module (not shown), and may be configured to receive current position information on a position in which the vehicle 1 is located, and provide the controller 150 with the current position information. The communicator 140 may be connected to a separate navigation device (not shown) in a wired or wireless manner to receive current position information from the navigation device and transmit the received current position information to the controller 150. The GPS module detects vehicle position information and time information. The GPS module may detect distance information about a distant away from the satellite and time information at which the distance information is measured, apply trigonometry to the detected distance information to detect three-dimensional (3D) position information according to latitude, longitude and altitude, and provide the controller 150 with the position information and time information.

The controller 150 may include the ECU (101*b* in FIG. 1) of the camera module (101 in FIG. 1) and/or the ECU (102*b* in FIG. 1) of the radar module (102 in FIG. 1), and/or an integrated ECU.

The controller 150 includes a processor 151 and a memory 152.

The processor 151 may process the front image data of the front camera 110, the front radar data of the front radar 120, and the corner radar data of the plurality of corner radars 130, and generate a braking signal and a steering signal for controlling the braking system 32 and the steering system 42. For example, the processor 151 may include an image processor for processing the front image data of the front camera 110 and/or a digital signal processor for processing radar data of the radars 120 and 130, and/or a micro controller (MCU) for generating a braking signal and/or a steering signal.

The processor 151 may detect obstacles (e.g., another vehicle, a pedestrian, a cyclist, and the like) in front of the vehicle 1 based on the front image data of the front camera 110 and the front radar data of the radar 120.

In detail, the processor 151 may acquire a position (a distance and a direction) and a relative velocity of the obstacles in front of the vehicle 1 based on the front radar data of the front radar 120. The processor 151 may acquire position (direction) and type information (for example, whether the obstacle is another vehicle, a pedestrian, a cyclist or the like) of the obstacles existing in front of the vehicle 1 based on the front image data of the front camera 110. In addition, the processor 151 may match the obstacles detected by the front image data with the obstacles detected by the front radar data, and acquire the type information, the position, and the relative velocity of the obstacles in front of the vehicle 1 based on a result of the matching.

The processor 151 may generate a braking signal and a steering signal based on the type information, the position, and the relative velocity of the front obstacles.

The processor 151 may acquire a position (a distance and a direction) and a relative velocity of the objects on the lateral sides (front right side, front left side, rear right side, and rear left side) of the vehicle 1 based on corner radar data of the plurality of corner radars 130.

The processor 151 may transmit a steering signal to the steering system 42 based on the position (the distance and the direction) and the relative velocity of the objects (hereinafter, referred to as "side objects") located on the lateral sides of the vehicle 1.

The processor 151 may determine whether to avoid a collision with a front object by changing the travelling direction of the vehicle 1 based on the position (the distance and direction) and the relative velocity of the side objects of the vehicle 1. For example, if there is no object on the lateral side of the vehicle 1, the processor 151 may transmit a steering signal to the steering system 42 to avoid a collision with the front object. If it is determined, based on the position (the distance and direction) and the relative velocity of the side objects, that a collision with a side object is not predicted to occur after steering, the processor 150 may transmit a steering signal to the steering system 42 to avoid a collision with a front object. If it is determined, based on the position (the distance and direction) and the relative velocity of the side objects, that a collision with a side object is predicted to occur after steering, the processor 150 may not transmit a steering signal to the steering system 42.

The memory 152 stores programs and/or data for processing image data by the processor 151, programs and/or data for processing radar data by the processor 151, and programs and/or data for generating a braking signal and/or a steering signal by the processor 151.

The memory 152 may temporarily memorize the image data received from the front camera 110 and/or the radar data received from the radars 120 and 130, and may temporarily memorize a result of processing the image data and/or the radar data of the processor 151.

The memory 152 may include a volatile memory, such as a static-RAM (S-RAM), a dynamic RAM (D-RAM), and the like, and a non-volatile memory, such as a flash memory, a read only memory (ROM), an erasable programmable read only memory (EPROM), and the like.

A warning module 160 is a part for providing various types of information to the driver, and may be implemented as a display (not shown) or a speaker (not shown). For example, when there is a need to deliver a separate warning message to the driver during adaptive cruise control (ACC), the warning module 160 may provide a warning message visually or audibly.

The DAS 100 is not limited to that shown in FIG. 2, and may further include a LiDAR that scans the surrounding of the vehicle 1 and detects an object.

Hereinafter, an embodiment of a DAS according to an aspect and a method of controlling the same will be described in detail with reference to the accompanying drawings.

Figure 4:
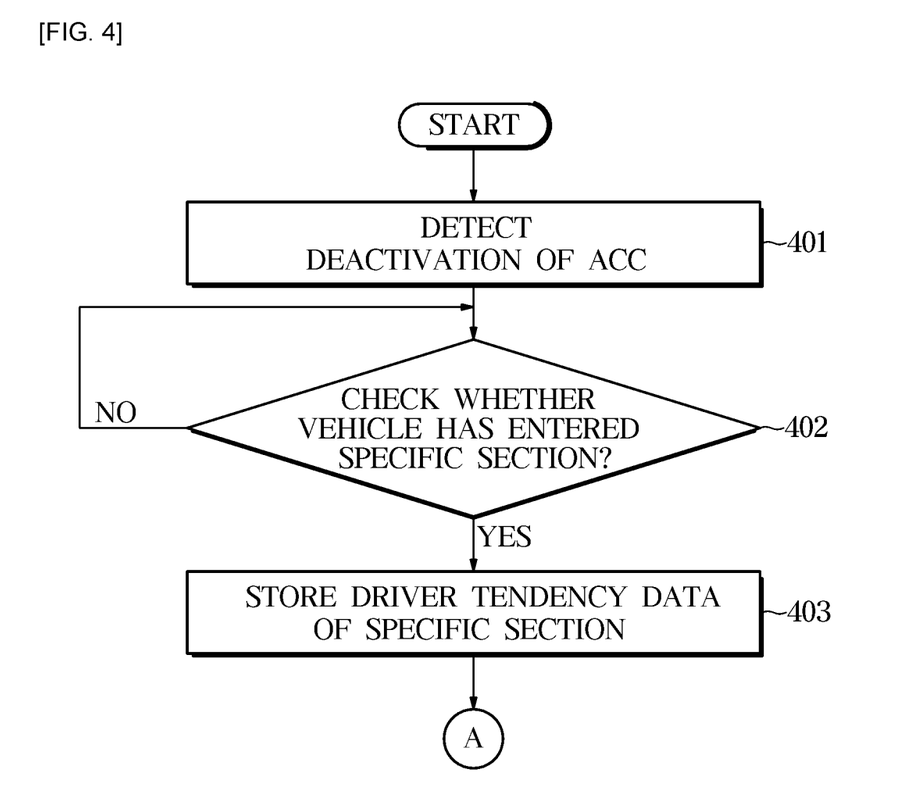
FIG. 4 is a flowchart showing a method of controlling a DAS according to an embodiment.
Figure 5:
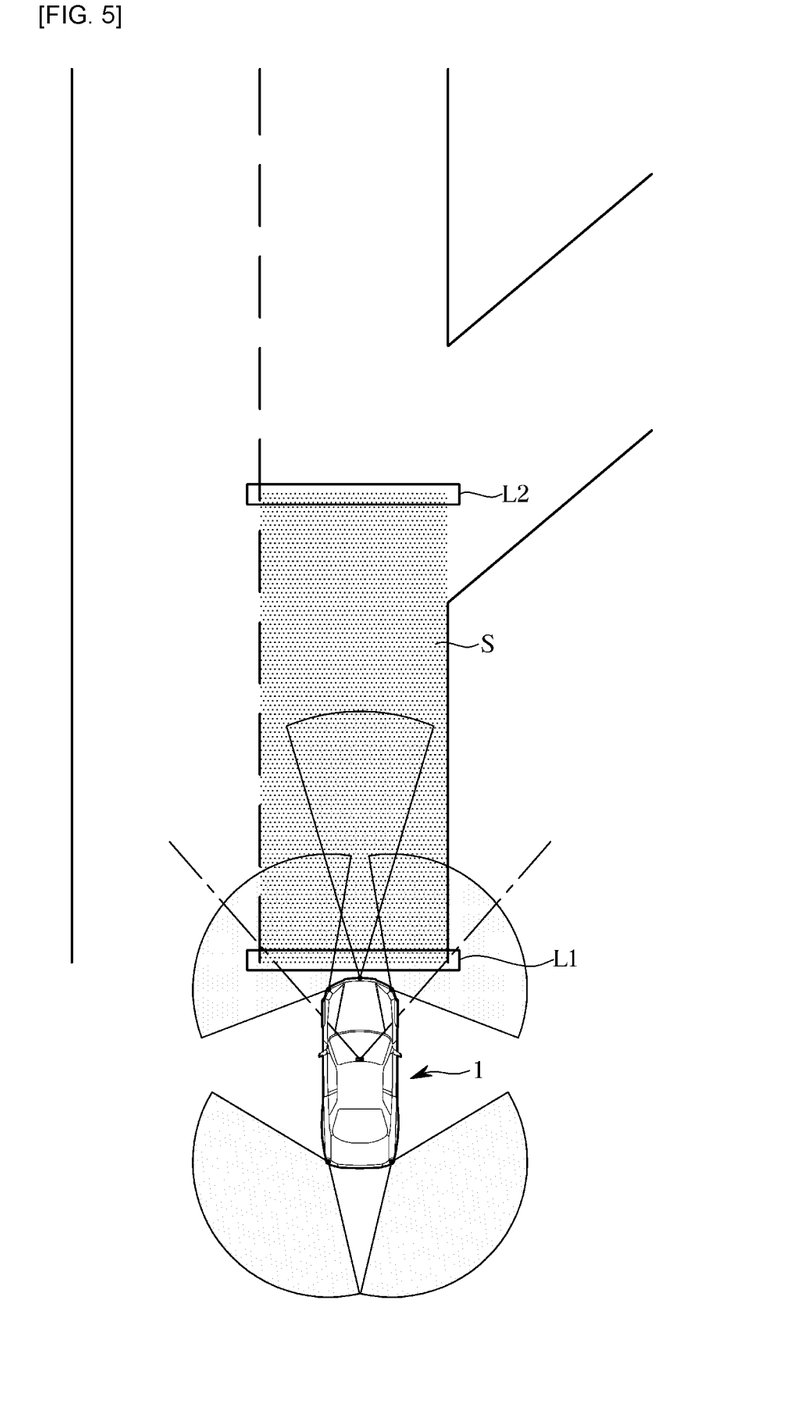
FIG. 5 is a view illustrating an example of a specific section referenced in an embodiment.

FIG. 4 is a flowchart showing a method of controlling a DAS according to an embodiment. FIG. 5 is a view illustrating an example of a specific section referenced in an embodiment.

The disclosure is provided to, upon entering a specific section during ACC, allow the vehicle 1 to travel by reflecting the individual driving tendency of the driver without depending on a following target vehicle travelling in front of the vehicle 1 such that a natural travelling sensibility is provided.

To this end, the embodiment according to FIG. 4 includes learning the driving tendency of the driver when the driver usually enters a specific section in a state in which ACC is deactivated, and in response to the driver entering the specific section at a later time in a state in which ACC is activated, operating based on a result of the learning so that the driver is provided with a natural driving sensibility.

The controller 150, upon detecting that the ACC of the vehicle 1 is deactivated (401), checks whether the vehicle 1 enters a specific section (402). The controller 150 receives position information from the communicator 140, and determines whether the current position information of the vehicle 1 corresponds to a predetermined specific section according to the present embodiment.

The deactivation of ACC refers to a state in which the driver is actively intervening in driving, and that there is no following target vehicle in front of the vehicle 1 or the driver is directly driving the vehicle 1. The specific section refers to a section in which it is difficult to drive depending only on the following target vehicle. For example, when only the following target vehicle is considered in an intersection, the vehicle 1 may collide with other vehicles approaching from various directions. Accordingly, in general, when a driver enters a specific section, the driver performs deceleration to avoid the risk of a collision.

The specific section may include a merging section, an exit section, and a speed limit section in addition to the intersection described above.

In addition, the specific section may include a U-shaped slope section. When the specific section is a U-shaped slope section, acceleration control or deceleration control in consideration of the slope as well as driver tendency data may be performed. When the specific section is a U-shaped slope section, not only acceleration control or deceleration control but also steering control may be performed by reflecting the driver tendency data. According to the disclosure, the steering control may be performed by reflecting rotational acceleration of the steering wheel by the driver among pieces of driver tendency data. Details thereof will be described below.

As described above, in order to acquire the driver's individual driving tendency in a specific section in which various variables are expected, the controller 150 controls to store driver tendency data of the specific section in the memory 152 (403).

Referring to FIG. 5, the driver tendency data includes information about an amount of decrease in acceleration, a deceleration start position L1, and a deceleration completion position L2 when the vehicle 1 approaches a specific section S. Specifically, the amount of decrease in acceleration indicates the degree of deceleration by the intention of the driver when the vehicle 1 approaches the specific section. In addition, the deceleration start position L1 indicates position information about a position at which the deceleration starts before or after entering the specific section, and the deceleration complete position L2 indicates position information about a position at which the deceleration is completed after entering the specific section.

In addition to the deceleration start position and the deceleration completion position, the driver tendency data may include various factors that may be involved during ACC.

For example, the driver tendency data may include a brake pedal pressure by the driver. In a state in which the ACC is deactivated, the memory 152 may cumulatively store the brake pedal pressures by the driver. In this case, the controller 150 may derive the average value of the pedal pressures and reflect the average value of the pedal pressures in the deceleration control. In addition, the controller 150 may calculate the average value of the pedal pressures for each specific section and control the memory 152 to store the average values.

In addition, the driver tendency data may include a rotational acceleration of the steering wheel by the driver. The controller 150 may perform steering control based on the driver tendency data during ACC to thereby implement a feeling as if the driver directly drives. In a state in which the ACC is deactivated, the memory 152 may cumulatively store the rotational accelerations by the driver. In this case, the controller 150 may derive the average value of the rotational accelerations and reflect the average value of the rotational accelerations in the steering control. In addition, the controller 150 may calculate the average value of the rotational accelerations for each specific section and control the memory 152 to store the average values.

Meanwhile, since one of the above-described pieces of driver tendency data may be subject to change whenever the driver enters the same specific section, the controller 150 may cumulatively store the driver tendency data whenever the vehicle 1 enters the specific section and derive the average value of the driver tendency data.

For example, in response to the vehicle 1 entering a specific section during ACC, the controller 150 may process the previously accumulated driver tendency data such that the vehicle 1 performs acceleration control or deceleration control based on the average value of the amounts of decrease in acceleration, rather than depending on ACC acceleration by the ACC.

In addition, in response to the vehicle 1 entering a specific section during ACC, the controller 150 may control the vehicle 1 not to depend on ACC at a position in which the frequency of deceleration starts is the highest.

In addition, in response to the vehicle 1 entering a specific section during ACC, the controller 150 may control the vehicle 1 to re-enter the ACC at a position in which the frequency of deceleration completions is the highest.

In the above, a method of collecting driver tendency data in a state in which ACC is deactivated has been described. The following description will be made in relation to operations of a control method based on driver tendency data with reference to FIGS. 6 and 7.

Figure 6:
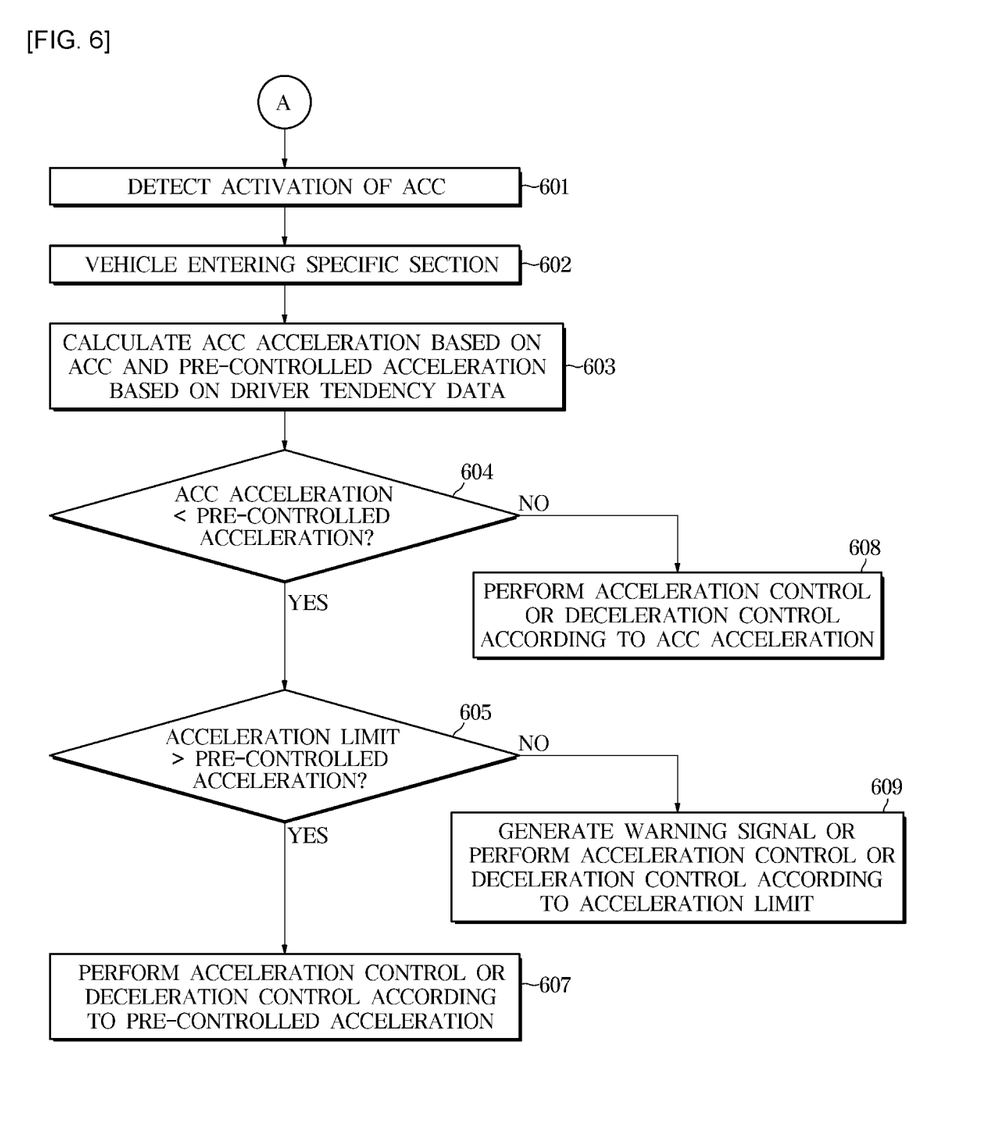
FIG. 6 is a flowchart showing a method of controlling a DAS according to an embodiment.

FIG. 6 is a flowchart showing a method of controlling a DAS according to an embodiment.

The controller 150 detects that ACC of the vehicle 1 is activated (601), and identifies whether the vehicle 1 has entered a specific section (602).

The controller 150, in response to the vehicle 1 entering the specific section, calculates an ACC acceleration based on ACC and a pre-controlled acceleration based on driver tendency data (603). The ACC acceleration is determined by a following target vehicle travelling in front of the vehicle 1 and the pre-controlled acceleration is determined based on driver tendency data obtained in the same specific section in the past. If the vehicle 1 enters the specific section during the ACC, the pre-controlled acceleration is preferentially applied prior to the ACC acceleration, and the vehicle 1 temporarily travels independent of the following target vehicle.

The controller 150 may compare the ACC acceleration with the pre-controlled acceleration (604), and if the ACC acceleration is greater than the pre-controlled acceleration, control the vehicle 1 to perform acceleration control or deceleration control according to the ACC acceleration (608). However, in this case, in order that the vehicle 1 naturally maintains the existing ACC while maintaining a safe distance from the following target vehicle, the controller 150 may control the vehicle 1 to travel at the ACC acceleration such that a predetermined distance from the following target vehicle is maintained or under the condition being less than a predetermined velocity.

The controller 150 may compare the ACC acceleration based on the ACC with the pre-controlled acceleration based on the driver tendency data (604), and if the pre-controlled acceleration is greater than the ACC acceleration, control the vehicle 1 to perform acceleration control or deceleration control according to the pre-controlled acceleration. In this case, the controller 150 may limit the pre-controlled acceleration according to a predetermined acceleration to prevent rapid acceleration or rapid deceleration in the specific section.

The controller 150 may compare the pre-controlled acceleration with a predetermined acceleration limit (605), and if the pre-controlled acceleration is less than the predetermined acceleration limit, control the vehicle 1 to perform acceleration control or deceleration control according to the pre-controlled acceleration (607).

The controller 150 may compare the pre-controlled acceleration with the predetermined acceleration limit (605), and if the pre-controlled acceleration is greater than the predetermined acceleration limit, control the warning module 160 to notify the driver of a warning or control the vehicle 1 to perform acceleration control or deceleration control according to the predetermined acceleration limit (609).

The above description has been made in relation to various embodiments in which, when the vehicle 1 enters a specific section, the ACC acceleration is adjusted and controlled based on previously acquired information about an amount of decrease or increase in acceleration. The following description will be made in relation to an embodiment in which, when the vehicle enters a specific section, the existing deceleration start position and the existing deceleration completion position of the driver are reflected in the control such that the driver feels as if actually driving even in the ACC.

Figure 7:
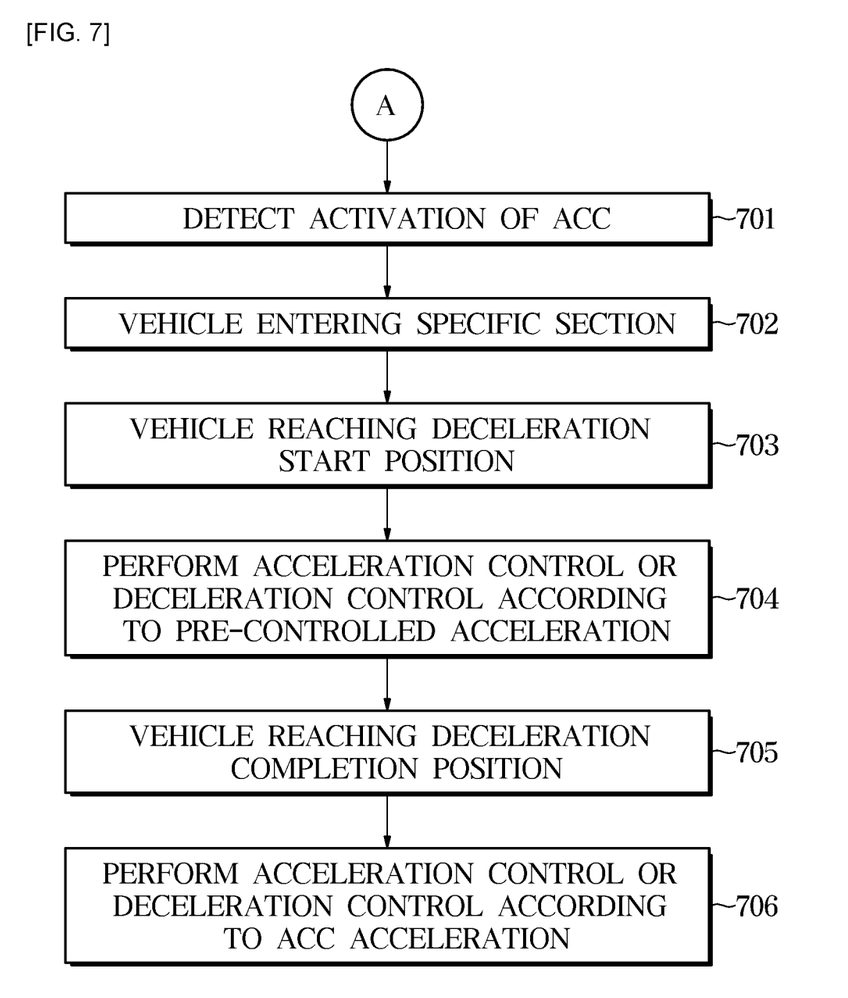
FIG. 7 is a flowchart showing a method of controlling a DAS according to another embodiment.

FIG. 7 is a flowchart showing a method of controlling a DAS according to another embodiment. The embodiment will be described in conjunction with FIG. 5.

The controller 150 detects that the ACC is activated (701), and checks whether the vehicle 1 has entered a specific section S. The controller 150 receives position information from the communicator 140, and determines whether the current position information of the vehicle 1 corresponds to the predetermined specific section S according to the embodiment.

In response to the vehicle 1 entering the specific section and reaching a stored deceleration start position L1 in a state in which the ACC of the vehicle 1 is activated (703), the controller 150 performs at least one of an acceleration control or a deceleration control according to a pre-controlled acceleration based on driver tendency data (704). In this case, the vehicle 1 is not only controlled according to the pre-controlled acceleration, but also controlled to perform the acceleration control or deceleration control at a position in which the driver most frequently starts deceleration in the specific section S, thereby providing the driver with a feeling of actually driving. For example, the controller 150 may control the vehicle 1 to start the deceleration control at the deceleration start position L1 in which the driver's deceleration control frequently occurs.

When the vehicle 1 passes the specific section to some extent and reaches a stored deceleration completion position L2 (705), the controller 150 performs at least one of acceleration control or deceleration control according to the ACC acceleration based on the ACC (706). This is a case, when the heading direction of the vehicle 1 is completely changed to a new exit lane, the driver does not have a feeling of alienation even with the ACC acceleration based on the existing ACC.

Meanwhile, the disclosed embodiments may be embodied in the form of a recording medium storing instructions executable by a computer. The instructions may be stored in the form of program code and, when executed by a processor, may generate a program module to perform the operations of the disclosed embodiments. The recording medium may be embodied as a computer-readable recording medium.

The computer-readable recording medium includes all kinds of recording media in which instructions which can be decoded by a computer are stored, for example, a Read Only Memory (ROM), a Random Access Memory (RAM), a magnetic tape, a magnetic disk, a flash memory, an optical data storage device, and the like.

As is apparent from the above, the individual driving tendency of the driver is reflected even during ACC so that a natural travelling sensibility can be provided.

Although embodiments of the present disclosure have been described for illustrative purposes, those skilled in the art will appreciate that various modifications, additions and substitutions are possible, without departing from the scope and spirit of the disclosure. Therefore, embodiments of the present disclosure have not been described for limiting purposes.

What is claimed is:

1. A driver assistance system (DAS) comprising:
a storage configured to store driver tendency data including an amount of decrease in acceleration when a vehicle approaches a specific section, in a state in which an adaptive cruise control (ACC) of the vehicle is deactivated; and
a controller including at least one processor configured to process the driver tendency data,
wherein the controller is configured to, upon the vehicle re-entering the specific section and reaching a stored deceleration start position in a state in which the ACC is activated, control the vehicle to perform at least one of acceleration control or deceleration control according to a pre-controlled acceleration based on the driver tendency data and upon the vehicle reaching a deceleration completion position, control the vehicle to perform at least one of the acceleration control or the deceleration control according to an ACC acceleration based on the ACC, and
wherein the driver tendency data further includes the deceleration start position and the deceleration completion position when the vehicle approaches the specific section, in the state in which the ACC of the vehicle is deactivated,
wherein the driver tendency data further includes a brake pedal pressure by the driver, and the controller is configured to derive an average value of the brake pedal pressures and reflect the average value of the brake pedal pressures in the deceleration control, and
wherein the driver tendency data further includes a rotational acceleration of a steering wheel by the driver, and the controller is configured to derive an average value of the rotational accelerations of the steering wheel and reflect the average value of the rotational accelerations of the steering wheel in a steering control in the state in which the ACC is activated.

2. The DAS of claim 1, wherein the storage is configured to cumulatively store the driver tendency data whenever the vehicle enters the specific section.

3. The DAS of claim 1, wherein the specific section includes at least one of a merging section, an exit section, an intersection, a U-shaped slope section, or a velocity limit section.

4. The DAS of claim 1, wherein
the controller is configured to
compare the ACC acceleration based on the ACC with the pre-controlled acceleration based on the driver tendency data, and in response to the ACC acceleration being greater than the pre-controlled acceleration, control the vehicle to perform at least one of the acceleration control or the deceleration control according to the ACC acceleration.

5. The DAS of claim 1, wherein
the controller is configured to
compare the ACC acceleration based on the ACC with the pre-controlled acceleration based on the driver tendency data, and in response to the pre-controlled acceleration being greater than the ACC acceleration, control the vehicle to perform at least one of the acceleration control or the deceleration control according to the pre-controlled acceleration.

6. The DAS of claim 5, wherein
the controller is configured to
compare the pre-controlled acceleration with a predetermined acceleration limit, and in response to the pre-controlled acceleration being less than the predetermined acceleration limit, control the vehicle to perform at least one of the acceleration control or the deceleration control according to the pre-controlled acceleration.

7. The DAS of claim 5, wherein
the controller is configured to
compare the pre-controlled acceleration with a predetermined acceleration limit, and in response to the pre-controlled acceleration being greater than the predetermined acceleration limit, control a warning module to notify the driver of a warning situation.

8. The DAS of claim 5, wherein
the controller is configured to
compare the pre-controlled acceleration with a predetermined acceleration limit, and in response to the pre-controlled acceleration being greater than the predetermined acceleration limit, control the vehicle to perform at least one of the acceleration control or the deceleration control according to the predetermined acceleration limit.

9. A method of controlling a driver assistance system (DAS), the method comprising:
storing driver tendency data including an amount of decrease in acceleration when a vehicle approaches a specific section, in a state in which an adaptive cruise control (ACC) of the vehicle is deactivated;
upon the vehicle re-entering the specific section and reaching a deceleration start position in a state in which the ACC is activated, controlling the vehicle to perform at least one of acceleration control or deceleration control according to a pre-controlled acceleration based on the driver tendency data; and
upon the vehicle reaching a deceleration completion position, controlling the vehicle to perform at least one of the acceleration control or the deceleration control according to an ACC acceleration based on the ACC,
wherein the driver tendency data further includes the deceleration start position and the deceleration completion position when the vehicle approaches the specific section, in the state in which the ACC of the vehicle is deactivated,
wherein the driver tendency data further includes a brake pedal pressure by the driver, and the controller is configured to derive an average value of the brake pedal pressures and reflect the average value of the brake pedal pressures in the deceleration control, and
wherein the driver tendency data further includes a rotational acceleration of a steering wheel by the driver, and the controller is configured to derive an average value of the rotational accelerations of the steering wheel and reflect the average value of the rotational accelerations of the steering wheel in a steering control in the state in which the ACC is activated.

10. The method of claim 9, wherein the storing of the driver tendency data includes
cumulatively storing the driver tendency data whenever the vehicle enters the specific section.

11. The method of claim 9, wherein the specific section includes at least one of a merging section, an exit section, an intersection, a U-shaped slope section, or a velocity limit section.

12. The method of claim 9, wherein the controlling of the vehicle includes comparing the ACC acceleration based on the ACC with the pre-controlled acceleration based on the driver tendency data, and in response to the ACC acceleration being greater than the pre-controlled acceleration, controlling the vehicle to perform at least one of the acceleration control or the deceleration control according to the ACC acceleration.

13. The method of claim 9, wherein the controlling of the vehicle includes
comparing the ACC acceleration based on the ACC with the pre-controlled acceleration based on the driver tendency data, and in response to the pre-controlled acceleration being greater than the ACC acceleration, controlling the vehicle to perform at least one of the acceleration control or the deceleration control according to the pre-controlled acceleration.

14. The method of claim 13, wherein the controlling of the vehicle includes
comparing the pre-controlled acceleration with a predetermined acceleration limit, and in response to the pre-controlled acceleration being less than the predetermined acceleration limit, controlling the vehicle to perform at least one of the acceleration control or the deceleration control according to the pre-controlled acceleration.

15. The method of claim 13, wherein the controlling of the vehicle includes
comparing the pre-controlled acceleration with a predetermined acceleration limit, and in response to the pre-controlled acceleration being greater than the predetermined acceleration limit, controlling a warning module to notify the driver of a warning situation.

16. The method of claim 13, wherein the controlling of the vehicle includes
comparing the pre-controlled acceleration with a predetermined acceleration limit, and in response to the pre-controlled acceleration being greater than the predetermined acceleration limit, controlling the vehicle to perform at least one of the acceleration control or the deceleration control according to the predetermined acceleration limit.

\* \* \* \* \*